United States Patent
Bialon et al.

(10) Patent No.: US 10,981,551 B2
(45) Date of Patent: Apr. 20, 2021

(54) VALVE UNIT FOR MODULATING THE PRESSURE IN A PNEUMATIC BRAKE SYSTEM

(71) Applicant: WABCO Europe BVBA, Brussels (BE)

(72) Inventors: Rafal Bialon, Olawa (PL); Andreas Teichmann, Isernhagen (DE); Alexander Wassmann, Suthfeld (DE)

(73) Assignee: WABCO Europe BVBA, Brussels (BE)

( * ) Notice: Subject to any disclaimer, the term of this patent is extended or adjusted under 35 U.S.C. 154(b) by 62 days.

(21) Appl. No.: 16/061,663

(22) PCT Filed: Nov. 7, 2016

(86) PCT No.: PCT/EP2016/001840
§ 371 (c)(1),
(2) Date: Jun. 13, 2018

(87) PCT Pub. No.: WO2017/102044
PCT Pub. Date: Jun. 22, 2017

(65) Prior Publication Data
US 2018/0370513 A1    Dec. 27, 2018

(30) Foreign Application Priority Data

Dec. 15, 2015 (DE) .................... 10 2015 016 264.0

(51) Int. Cl.
*B60T 8/36* (2006.01)
*B60T 13/68* (2006.01)
(Continued)

(52) U.S. Cl.
CPC .......... *B60T 13/683* (2013.01); *B60T 8/3605* (2013.01); *B60T 13/26* (2013.01); *B60T 8/1761* (2013.01)

(58) Field of Classification Search
CPC .............................. B60T 15/027; B60T 8/3605
See application file for complete search history.

(56) References Cited

U.S. PATENT DOCUMENTS 3,977,734 A    8/1976   Ronnhult et al.
4,196,941 A *  4/1980   Goebels .................. B60T 8/343
                                                              303/119.3
(Continued)

FOREIGN PATENT DOCUMENTS

DE    7219252 U     8/1972
DE    3940232 A1    6/1991
(Continued)

*Primary Examiner* — Bradley T King
*Assistant Examiner* — Stephen M Bowes
(74) *Attorney, Agent, or Firm* — Leydig, Voit & Mayer, Ltd.

(57) ABSTRACT

A valve unit for modulating pressure in a pneumatic brake system includes an inlet valve and an outlet valve, which are designed as diaphragm valves, and via which a brake pressure outlet can be connected to a brake pressure inlet or a vent outlet or can be shut off relative thereto. The valve unit further includes two pilot valves, designed as 3/2-way solenoid valves, via each of which a control chamber adjoining a diaphragm of an associated diaphragm valve can be supplied with a control pressure via a control pressure line. The diaphragm valves are arranged radially adjacent to each other. The inlet valve and/or the outlet valve is/are each designed as a springless diaphragm valve and in that the associated control pressure line opens, in each case centrally and in an axially oriented manner, into the control chamber of the relevant diaphragm valve.

17 Claims, 4 Drawing Sheets

(51) Int. Cl.
*B60T 13/26* (2006.01)
*B60T 8/1761* (2006.01)

(56) References Cited

U.S. PATENT DOCUMENTS

| | | | | |
|---|---|---|---|---|
| 5,100,208 | A * | 3/1992 | Angermair | B60T 8/36 |
| | | | | 303/36 |
| 5,733,018 | A * | 3/1998 | Goebels | B60T 8/3605 |
| | | | | 303/118.1 |
| 6,209,971 | B1 * | 4/2001 | Ho | B60T 8/343 |
| | | | | 303/119.2 |
| 8,672,421 | B2 | 3/2014 | Eidenschink et al. | |
| 2012/0181852 | A1 * | 7/2012 | Grebe | B60T 8/3605 |
| | | | | 303/113.1 |
| 2013/0220461 | A1 | 8/2013 | Shigeta et al. | |
| 2016/0229384 | A1 | 8/2016 | Couppee et al. | |
| 2017/0217412 | A1 | 8/2017 | Knoke et al. | |

FOREIGN PATENT DOCUMENTS

| | | | |
|---|---|---|---|
| DE | 102008035372 A1 | 2/2010 | |
| DE | 102013202913 A1 | 8/2013 | |
| DE | 102013015830 A1 | 3/2015 | |
| DE | 102014012712 A1 | 3/2016 | |
| EP | 0498584 B1 | 1/1996 | |
| GB | 1557347 A * | 12/1979 | ............ B60T 8/3605 |
| JP | 0840253 A | 2/1996 | |
| JP | H083-01088 A1 * | 11/1996 | ............ B60T 8/3605 |

* cited by examiner

VALVE UNIT FOR MODULATING THE PRESSURE IN A PNEUMATIC BRAKE SYSTEM

CROSS REFERENCE TO RELATED APPLICATIONS

This application is a U.S. National Stage Application under 35 U.S.C. § 371 of International Application No. PCT/EP2016/001840 filed on Nov. 7, 2016, and claims benefit to German Patent Application No. DE 10 2015 016 264.0 filed on Dec. 15, 2015. The International Application was published in German on Jun. 22, 2017 as WO 2017/102044 A1 under PCT Article 21(2).

FIELD

The invention relates to a valve unit for modulating the pressure in a pneumatic brake system.

BACKGROUND

In pneumatic brake systems of wheeled vehicles, such as motor vehicles and rail vehicles, valve units of the type stated can be used as brake valves, relay valves and ABS control valves. A valve unit of this kind has an inlet valve and an outlet valve. By means of the inlet valve, a brake pressure outlet, to which a brake circuit or a brake line leading to a wheel brake cylinder can be connected, can alternately be connected to a brake pressure inlet, at which a brake line coming from a brake valve or a relay valve can be connected, or can be shut off relative thereto. By means of the outlet valve, the brake pressure outlet can alternately be connected to a vent outlet, which usually leads into the environment via a muffler, or shut off from said outlet.

Owing to the need to control large volume flows and the need for correspondingly large flow cross sections to be opened and closed, the inlet valve and the outlet valve are often designed as pneumatically actuable diaphragm valves which can be controlled by means of respective pilot valves designed as 3/2-way solenoid valves. A diaphragm valve has a largely circular-disk-shaped flexible diaphragm, which is clamped in a valve housing at its radial edge. A cylindrical central passage having a circular valve seat facing the diaphragm and an outer annular passage which is concentric therewith are arranged coaxially with the actuation axis of the respective diaphragm valve on the axial inner side of the diaphragm, on which the flow passages connected to the compressed air inlets and compressed air outlets are arranged. Arranged on the axially opposite outer side of the diaphragm is a control chamber, which can alternately be supplied by the associated pilot valve with a high control pressure, generally taken from the brake pressure inlet, or with a low control pressure, which is taken from the vent outlet or some other point and generally corresponds to the ambient pressure.

When the control chamber is supplied with the high control pressure, the diaphragm is pressed against the valve seat, thereby shutting off the central passage from the radially outer annular passage, this corresponding to the closed state of the relevant diaphragm valve. When the control chamber is supplied with the low control pressure, the diaphragm, which rests automatically against the valve seat by virtue of its shape and/or by virtue of a valve spring, is raised from the valve seat by the brake pressure prevailing in the flow passages and is moved in the direction of the control chamber, thereby connecting the central passage to the annular passage, which corresponds to the opened state of the relevant diaphragm valve.

In respect of the geometrical arrangement, in a valve housing, of the compressed air inlets and compressed air outlets of the inlet valves and outlet valves designed as diaphragm valves and those of the pilot valves designed as solenoid valves, embodiments of valve units are known in which the compressed air inlets and compressed air outlets as well as the diaphragm valves are arranged with parallel actuation axes in a first housing part, the pilot valves are arranged in a second housing part, and the diaphragms of the diaphragm valves are clamped between the two housing parts.

A valve unit of this kind is described in U.S. Pat. No. 3,977,734 A, for example. In this known valve unit, a valve housing is divided by a parting plane that is horizontal in the installed position into a housing bottom part and a housing top part. The brake pressure inlet, the brake pressure outlet and the vent outlet are arranged in the housing bottom part. The pilot valves are arranged in the housing top part with actuation axes aligned parallel to one another and perpendicularly to the parting plane. The diaphragm valves are arranged with parallel actuation axes in the housing bottom part, wherein the diaphragms are clamped between the housing bottom part and the housing top part in a common diaphragm plane corresponding largely to the parting plane.

In another valve unit of this kind, which is known from EP 0 498 584 B1, the valve housing is divided into an inlet housing and the outlet housing by a parting plane that is vertical in the installed position. Although the brake pressure inlet is arranged in the inlet housing, it is connected directly by a connecting passage to an inlet passage situated in the outlet housing. The brake pressure outlet and the vent outlet are arranged directly in the outlet housing. The pilot valves are grouped together, with parallel actuation axes, in a valve block, which is inserted in a sealed manner into a recess in the inlet housing. The diaphragm valves are arranged with parallel actuation axes in the outlet housing, wherein the diaphragms are clamped between the inlet housing and the outlet housing in a common diaphragm plane largely corresponding to the parting plane.

Finally, U.S. Pat. No. 8,672,421 B2 describes a valve unit in which a valve housing is divided by parting planes that are largely horizontal in the installed position into a housing bottom part, a housing top part and an intermediate plate arranged therebetween. The brake pressure inlet, the brake pressure outlet and the vent outlet are arranged in the housing bottom part. The pilot valves are arranged in the housing top part with actuation axes aligned parallel to one another and perpendicularly to the parting plane between the intermediate plate and the housing top part and with the same direction of actuation, wherein the valve seats are component parts of the intermediate plate. The diaphragm valves are arranged with parallel actuation axes in the housing bottom part, wherein the diaphragms are clamped between the housing bottom part and the intermediate plate in a common diaphragm plane largely corresponding to the parting plane between the housing bottom part and the intermediate plate.

SUMMARY

In an embodiment, the present invention provides a valve unit for modulating pressure in a pneumatic brake system. The valve unit includes an inlet valve and an outlet valve, which are designed as diaphragm valves, and via which a brake pressure outlet can be connected to a brake pressure inlet or a vent outlet or can be shut off relative thereto. The valve unit further includes two pilot valves, designed as 3/2-way solenoid valves, via each of which a control chamber adjoining a diaphragm of an associated diaphragm valve can be supplied with a control pressure via a control pressure line. The diaphragm valves are arranged radially adjacent to each other, with parallel actuation axes, in a valve housing, and the diaphragms of the diaphragm valves are clamped between two housing parts. The inlet valve and/or the outlet valve is/are each designed as a springless diaphragm valve and in that the associated control pressure line opens, in each case centrally and in an axially oriented manner, into the control chamber of the relevant diaphragm valve.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
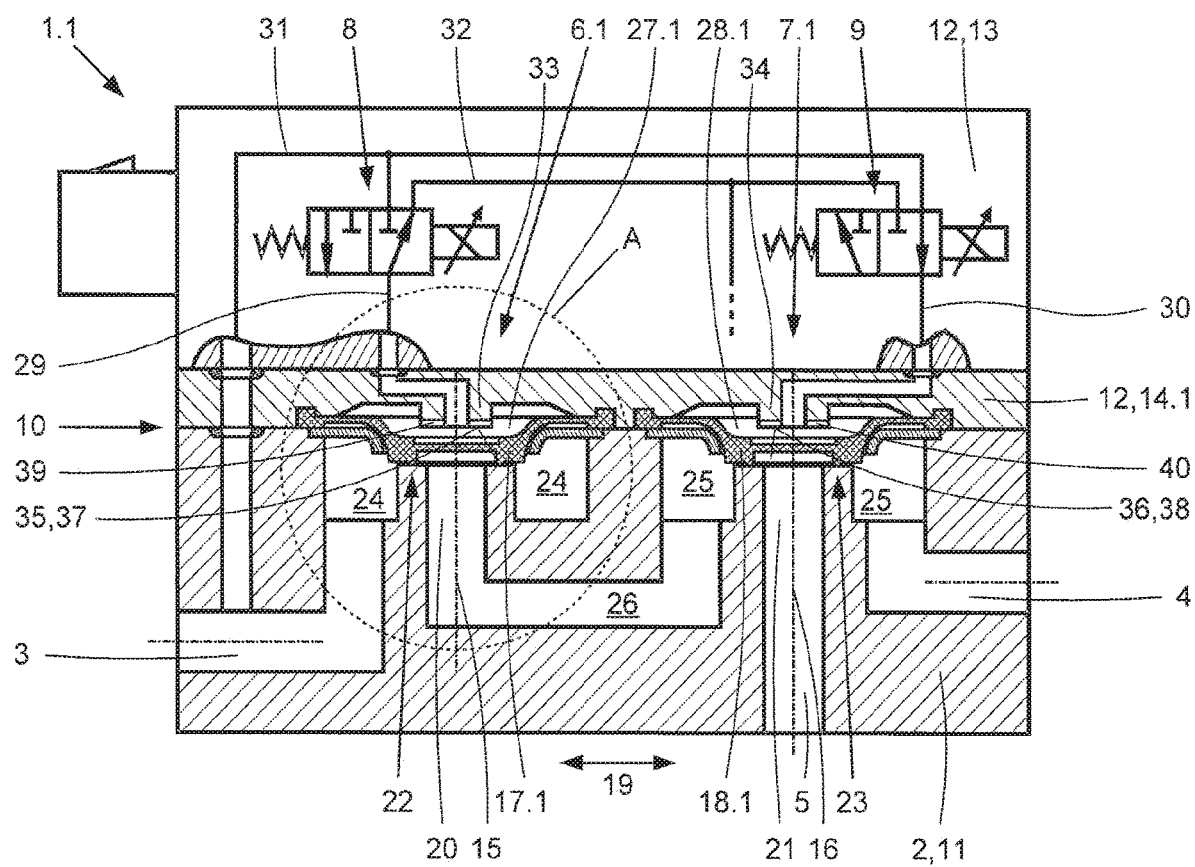
FIG. 1 shows a valve unit according to a first embodiment of the invention in a vertical longitudinal section.

The diaphragm valves of the known valve units each have a valve spring, which is arranged between the diaphragm and the inner wall of the relevant control chamber or a spring seat machined into that area and by which the diaphragm is pressed against the valve seat in the unpressurized state, thus allowing rapid closure of the diaphragm valve. As a disadvantage, however, the valve springs cause a basic closing force which delays the opening of the diaphragm valves. Moreover, it is also possible for the valve springs to be forgotten or incorrectly installed during the assembly of the valve unit without it being possible to detect this when checking operation, this generally being carried out as part of a quality control operation after assembly has been completed.

One or more embodiments of the present invention provide valve units having an improved response behavior of the diaphragm valves and in which the design-related assembly errors can be avoided.

One or more embodiments of the invention provide a valve unit for modulating the pressure in a pneumatic brake system, having an inlet valve and an outlet valve, which are designed as diaphragm valves, and via which a brake pressure outlet can be connected to a brake pressure inlet or a vent outlet or can be shut off relative thereto, and having two pilot valves, designed as 3/2-way solenoid valves, via each of which a control chamber adjoining the diaphragm of the associated diaphragm valve can be supplied with a control pressure via a control pressure line, wherein the diaphragm valves are arranged radially adjacent to each other, with parallel actuation axes, in a valve housing, and the diaphragms of the diaphragm valves are clamped between two housing parts. Provision is furthermore made, in the case of this valve unit, for the inlet valve and/or the outlet valve each to be designed as a springless diaphragm valve and for the associated control pressure line to open, in each case centrally and in an axially oriented manner, into the control chamber of the relevant diaphragm valve.

Instead of a valve spring, by means of which the diaphragm is pressed against the valve seat in the unpressurized state and thus rapid pressuretight closure of the relevant diaphragm valve is made possible, the respective diaphragm is now held against the valve seat in the unpressurized state only by virtue of its shape. However, when the relevant control chamber is supplied with the high control pressure via the associated pilot valve to pressuretightly close the diaphragm valve, the compressed control air concerned flows into the control chamber in such a way as to be precisely opposite the valve seat by virtue of the centrally and axially aligned entry of the control pressure line. As a result, the diaphragm is pressed against the valve seat both by the high static pressure and by the dynamic pressure of the inflowing compressed control air, and hence the relevant diaphragm valve is closed quickly. Conversely, the compressed control air flows out of the control chamber again in such a way as to be precisely opposite the valve seat when the relevant control chamber is supplied with the low control pressure via the associated pilot valve to open the diaphragm valve. As a result, the diaphragm is raised from the valve seat and the relevant diaphragm valve is thus opened quickly by the pressure of the outflowing compressed control air, which falls below the low control pressure owing to the Venturi effect, and by the brake pressures present opposite thereto in the flow passages of the diaphragm valve. In comparison with a diaphragm valve provided with a valve spring, a shorter switching time when opening the diaphragm valve is thus achieved. Moreover, production and assembly costs for the valve unit are saved and possible assembly errors avoided by the elimination of the valve springs. As a positive side effect, this also results in an increase in the effective volume of the control chambers without a change in the principal dimensions since the elimination of the valve springs means that the volume of said springs is added.

In order to reinforce the pressure effect of the compressed control air flowing in and out of the control chamber, provision can be made, according to one embodiment, for the control pressure line to end in a tubular nozzle projecting axially into the control chamber of the diaphragm valve to form a nozzle/baffle plate unit. By virtue of the relatively small clearance thereby achieved between the outer edge of the tubular nozzle and the diaphragm, the pressure of the inflowing compressed control air acting on the diaphragm is higher and that of the outflowing compressed air is lower, with the result that the relevant diaphragm valve is closed and opened more quickly.

In the case of diaphragm valves provided with valve springs, the deflection of the diaphragms during the opening of the diaphragm valves is generally limited by the valve springs, which are compressed into a block. Owing to the elimination of the valve springs, this possibility is now no longer available. According to another embodiment, provision is therefore made for the tubular nozzle of the control pressure line to project to such an extent into the control chamber of the diaphragm valve that the axial outer edge thereof acts as a stop surface for the diaphragm when the diaphragm valve is opened.

To ensure that the diaphragm is not damaged by the outer edge of the tubular nozzle when the diaphragm rests against said edge, the outer edge of the tubular nozzle is designed as a flat annular surface in order to reduce the surface pressure on the diaphragm.

As the compressed control air flows out of the control chamber, the diaphragm can be sucked firmly against the outer edge of the tubular nozzle, which would prevent the compressed control air from flowing out completely and hence prevent the complete opening of the relevant diaphragm valve. Provision is therefore preferably made for the outer edge of the tubular nozzle to be provided with at least one recess to prevent the diaphragm from becoming stuck due to suction. The recess in the outer edge of the tubular nozzle is preferably designed as a diagonal groove which is semicircular in cross section since such an embodiment is simple to produce.

To reinforce the effect of the nozzle/baffle plate unit, the diaphragm can have a cylindrical annular web which projects axially into the control chamber and the inside diameter of which is greater than the outside diameter of the tubular nozzle of the control pressure line. By means of the annular web of the diaphragm, the effect of the nozzle/baffle plate unit is especially reinforced if the outer edge of the annular web projects beyond the outer edge of the tubular nozzle axially in the direction of the inner wall of the control chamber when the diaphragm is closed since the inflowing and outflowing compressed control air is then deflected through about 180° around the outer edge of the tubular nozzle.

It is also possible for the annular web of the diaphragm to project to such an extent into the control chamber that, as an alternative to the outer wall of the tubular nozzle, the axially opposite inner wall of the control chamber acts as a stop surface for the diaphragm in interaction with the outer edge of the annular web when the diaphragm valve is opened.

To ensure that the diaphragm is not damaged when the annular web rests against the inner wall of the control chamber, the outer edge of the annular web is expediently designed as a flat annular surface in order to reduce the surface pressure when resting against the inner wall of the control chamber.

In this embodiment of the diaphragm, the diaphragm can be sucked firmly against the inner wall of the control chamber with the outer edge of the annular web as the compressed control air flows out of the control chamber, which would prevent the compressed control air from flowing out completely and hence prevent the complete opening of the relevant diaphragm valve. Provision is therefore preferably made for the outer edge of the annular web to be provided with at least one recess to prevent the diaphragm from becoming stuck on the inner wall of the control chamber due to suction.

The recess in the outer edge of the annular web is preferably designed as a diagonal groove which is semicircular in cross section since such an embodiment is simple to produce and has a low notching effect with little tendency for cracking.

Accordingly, a valve unit 1.1 according to a first embodiment of the invention is depicted in FIG. 1 in a vertical longitudinal section. A brake pressure inlet 3, a brake pressure outlet 4, a vent outlet 5, an inlet valve 6.1 designed as a diaphragm valve, an outlet valve 7.1 designed as a diaphragm valve, and respective pilot valves 8, 9, designed as 3/2-way solenoid valves, for each diaphragm valve 6.1, 7.1 are arranged in an elongate valve housing 2.

The valve housing 2 is divided by a parting plane 10 that is largely horizontal in the installed position into a base housing 11 and a housing cover 12. The housing cover 12 surrounds a control unit 13, which contains the solenoid valves 8, 9, and an intermediate plate, which is arranged between the base housing 11 and the control unit 13. The control unit 13 and the intermediate plate 14.1 can be screwed or latched to one another or connected firmly to one another in some other way. The housing cover 12 formed in this way can be connected, in particular screwed, in unitary fashion to the base housing 11. However, it is also possible for the control unit 13 and the intermediate plate 14.1 to be connected separately to the base housing.

The brake pressure inlet 3 and the brake pressure outlet 4 are arranged to a large extent axially opposite in a horizontal orientation when viewed in the longitudinal direction 19 of the valve housing 2, while the vent outlet 5 is arranged therebetween in a vertically downward direction in the base housing 11. The two diaphragm valves 6.1, 7.1 are arranged in series in the longitudinal direction 19 in the base housing 11, between the brake pressure inlet 3 and the brake pressure outlet 4, with parallel actuation axes 15, 16 and with the two diaphragms 17.1, 18.1 arranged in a common diaphragm plane largely corresponding to the parting plane 10, said diaphragms being clamped between the base housing 11 and the intermediate plate 14.1 of the housing cover 12. The pilot valves 8, 9 illustrated purely schematically in FIG. 1 are arranged completely in the control unit 13 of the housing cover 12.

Within the base housing 11, coaxially with the actuation axes 15, 16, the two diaphragm valves 6.1, 7.1 each have a cylindrical central passage 20, 21 having a circular valve seat 22, 23, which faces the diaphragm 17.1, 18.1, and a radially outer annular passage 24, 25, which is arranged concentrically with said seat. The annular passage 24 of the inlet valve 6.1 is connected directly to the brake pressure inlet 3. The central passage 20 of the inlet valve 6.1 is connected by a connecting passage 26 to the annular passage 25 of the outlet valve 7.1, which, for its part, is connected directly to the brake pressure outlet 4. The central passage 21 of the outlet valve 7.1 is connected directly to the vent outlet 5.

Respective control chambers 27.1, 28.1, into which respective control pressure lines 29, 30 open, are arranged on the outer side of the two membranes 17.1, 18.1, which axially faces the housing cover 12. Via these control pressure lines 29, 30, the control chambers 27.1, 28.1 of the diaphragm valves 6.1, 7.1 can alternately be supplied by the respectively associated pilot valve 8, 9 with a high control pressure taken from the brake pressure inlet 3 via a control pressure line 31 or with a low control pressure, corresponding to the ambient pressure, taken from the vent outlet 5 or from some other point via a control pressure line 32. When the respective control chambers 27.1, 28.1 are supplied with the high control pressure, the relevant diaphragm 17.1, 18.1 is pressed onto the associated valve seat 22, 23, as a result of which the relevant diaphragm valve 6.1, 7.1 is closed. When the respective control chambers 27.1, 28.1 are supplied with the low control pressure, the relevant diaphragm 17.1, 18.1 can be pushed away from the valve seat 22, 23 by the brake pressure prevailing in the adjoining flow passages 20, 24; 21, 25, as a result of which the relevant diaphragm valve 6.1, 7.1 is opened.

The valve unit 1.1 has the switching functions "increase pressure", "hold pressure" and "lower pressure". In the switching function "increase pressure", the inlet valve 6.1 is open and the outlet valve 7.1 is closed, with the result that the brake pressure inlet at the brake pressure inlet 3 via a brake valve or a relay valve is transmitted without modification to the brake pressure outlet 4 and to the brake circuit or wheel brake cylinder connected thereto. Since the switching function "increase pressure" corresponds to the state of rest of the valve unit 1.1, the pilot valve 8 of the inlet valve 6.1 connects the control chamber 27.1 of the inlet valve 6.1 to the control pressure line 32 carrying the low control pressure in the deenergized state of the solenoid of said pilot valve. The pilot valve 9 of the outlet valve 7.1 likewise connects the control chamber 28.1 of the outlet valve 7.1 to the control pressure line 31 carrying the high control pressure in the deenergized state of the solenoid of said pilot valve. In the switching function "hold pressure" of the valve unit 1.1, the inlet valve 6.1 and the outlet valve 7.1 are closed, with the result that the brake pressure applied to the brake pressure outlet 4 and to the brake circuit or wheel brake cylinder connected thereto is held constant. To set this switching function, only the pilot valve 8 of the inlet valve 6.1 is switched over by energization of its solenoid, and the control chamber 27.1 of the inlet valve 6.1 is thus supplied with the high control pressure.

In the switching function "lower pressure" of the valve unit 1.1, the inlet valve 6.1 is closed and the outlet valve 7.1 is open, with the result that the brake pressure outlet 4 and the brake circuit or wheel brake cylinder connected thereto are vented via the vent outlet 5. To set this switching function, both pilot valves 8, 9 are switched over by energization of their solenoids, and the control chamber 27.1 of the inlet valve 6.1 is thus supplied with the high control pressure, and the control chamber 28.1 of the outlet valve 7.1 is thus supplied with the low control pressure.

The switching functions "hold pressure" and "lower pressure" of the valve unit 1.1 are also antilock functions, by means of which braking-induced locking up of the associated wheel can be prevented when the valve unit 1.1 is used as an ABS control valve. The antilock functions are controlled through appropriate activation of the pilot valves by an ABS control unit, in which the signals from wheel speed sensors are evaluated in order to detect locking up of the braked wheels that is imminent or has already occurred.

According to the embodiment of the invention, the inlet valve 6.1 and the outlet valve 7.1 are each designed as a springless diaphragm valve and the associated control pressure line 29, 30 opens, in each case centrally and in an axially oriented manner, into the control chamber 27.1, 28.1 of the relevant diaphragm valve 6.1, 7.1. When the respective control chamber 27.1, 28.1 is supplied with the high control pressure, the relevant diaphragm 17.1, 18.1 is pressed directly against the associated valve seat 22, 23 by the jet of compressed control air, which is directed centrally at said diaphragm, as a result of which the relevant diaphragm valve 6.1, 7.1 is quickly closed. On the other hand, when the respective control chamber 27.1, 28.1 is supplied with the low control pressure, the raising of the relevant diaphragm 17.1, 17.2 from the associated valve seat 22, 23 is assisted by the outflowing compressed control air owing to the reduced pressure which occurs during this process, as a result of which the relevant diaphragm valve 6.1, 7.1 is quickly opened. In comparison to diaphragm valves provided with a valve spring, a shorter switching time during the opening of the diaphragm valves 6.1, 7.1 is thereby achieved. Moreover, the elimination of the valve springs lowers the production and assembly costs of the valve unit 1.1 and avoids possible assembly errors.

Figure 1A:
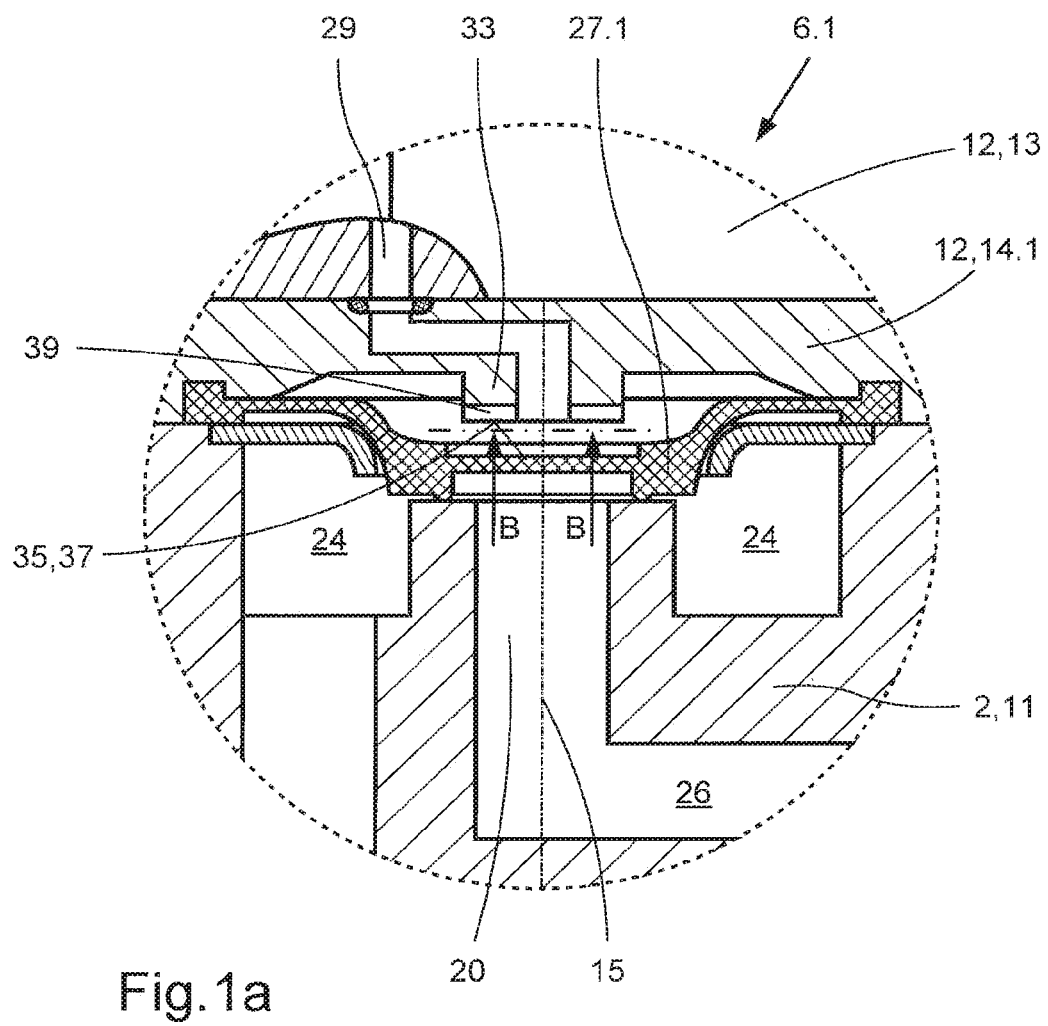
FIG. 1a shows the valve unit according to FIG. 1 in an enlarged detail.

As can be seen particularly clearly in the detail A from FIG. 1, which is depicted on an enlarged scale in FIG. 1*a*, the control pressure lines 29, 30 in the present embodiment of the diaphragm valves 6.1, 7.1 each end in a tubular nozzle 33, 34 projecting axially into the control chamber 27.1, 28.1 of the diaphragm valve 6.1, 7.1 to form a nozzle/baffle plate unit. The tubular nozzles 33, 34 of the control pressure lines 29, 30 each project to such an extent into the associated control chamber 27.1, 28.1 that the outer edge 35, 36 thereof acts as a stop for the respective diaphragm 17.1, 18.1 when the diaphragm valve 6.1, 7.1 is opened. In order to reduce the surface pressure when resting against the outer edge 35, 36 of the respective tubular nozzle 33, 34 and hence to avoid damage to the diaphragms 17.1, 18.1, the outer edges 35, 36 of the tubular nozzles 33, 34 are each designed as a flat annular surface 37, 38.

Figure 1B:
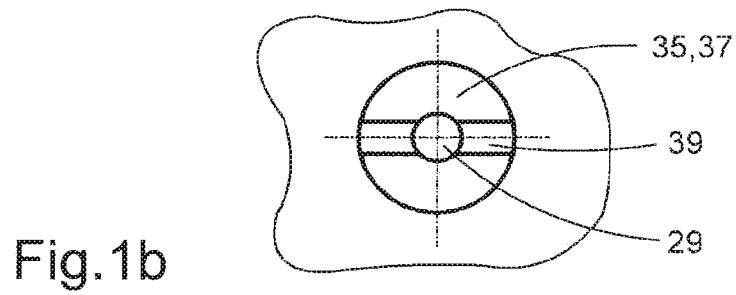
FIG. 1b shows a detail of the first embodiment of the valve unit according to FIGS. 1 and 1a in a fragmentary axial view.

The fragmentary axial view depicted in FIG. 1*b*, in which the direction of view B of the tubular nozzle 33 corresponds to that in FIG. 1*a*, illustrates that the outer edge 35, 36 of the tubular nozzles 33, 34 is provided with a respective recess 39, 40 to prevent the diaphragm 17.1, 18.1 from becoming stuck on the relevant tubular nozzle 33, 34 due to suction, said recess being designed in the present case as a diagonal groove of semicircular cross section.

Figure 2:
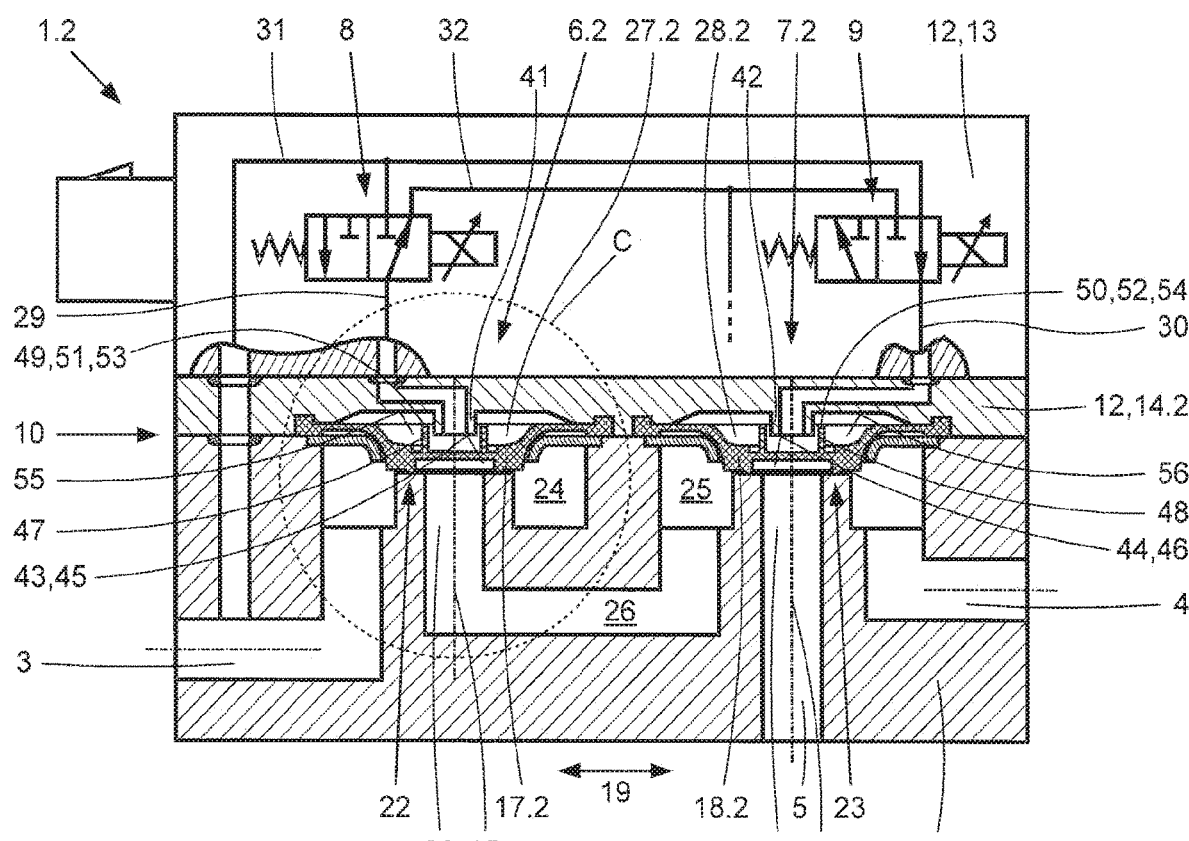
FIG. 2 shows a valve unit according to a second embodiment of the invention in a vertical longitudinal section.

A valve unit 1.2 according to a second embodiment of the invention, which is depicted in a vertical longitudinal section in FIG. 2, differs from the first embodiment of the valve unit 1.1 shown in FIG. 1 in having a different shape of the two diaphragms 17.2, 18.2 and of the tubular nozzles 41, 42 of the diaphragm valves 6.2, 7.2 while having the same basic construction and the same mode of operation.

Figure 2A:
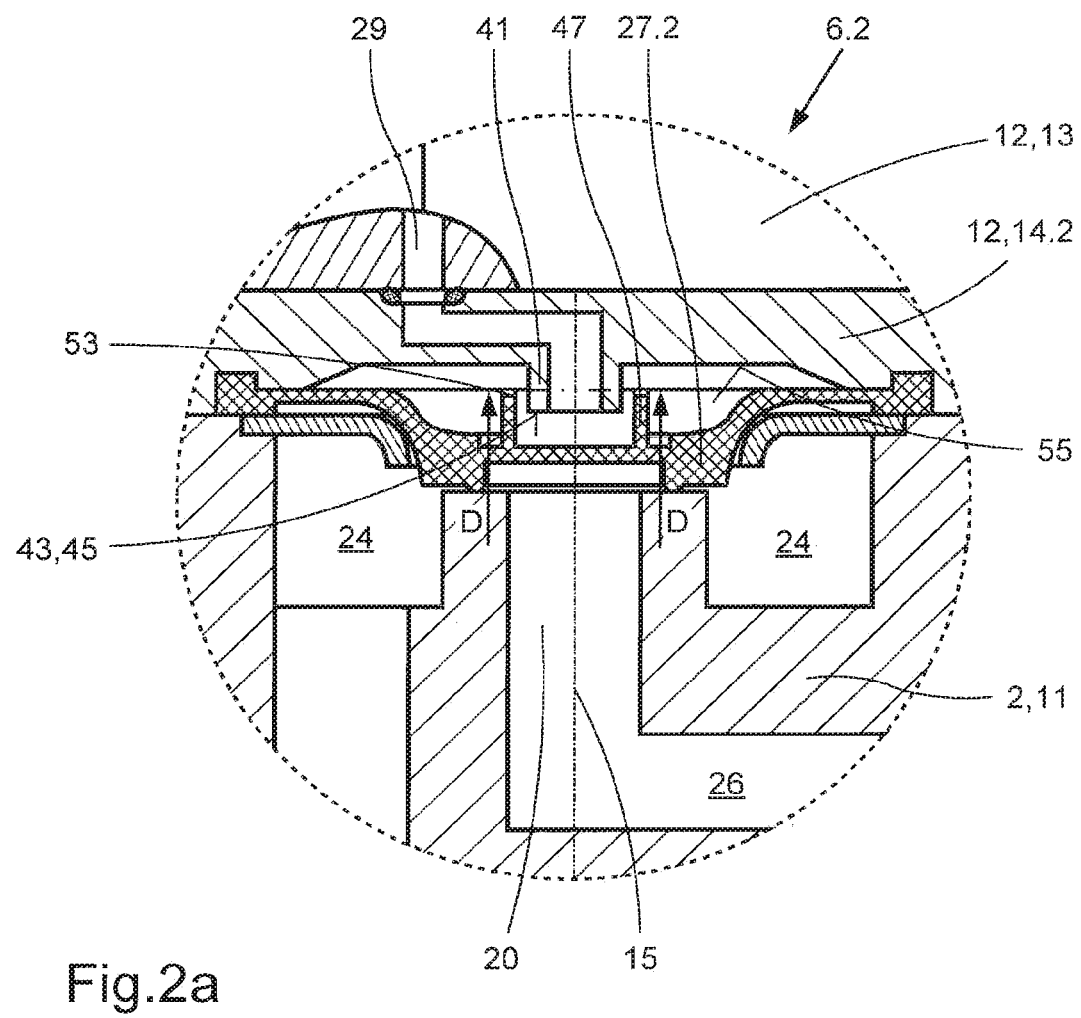
FIG. 2a shows the second embodiment of the valve unit according to FIG. 2 in an enlarged detail.

As can be seen particularly clearly in the detail C from FIG. 2, which is depicted on an enlarged scale in FIG. 2*a*, the tubular nozzles 41, 42, via which the control pressure lines 29, 30 open into the control chamber 27.2, 28.2 of the respective diaphragm valve 6.2, 7.2, now each have a smaller outside diameter and an outer edge 43, 44 which is designed as a flat annular surface 45, 46 and is not interrupted by recesses. To reinforce the effect of the nozzle/baffle plate unit, the two diaphragms 17.2, 18.2 now each have a cylindrical annular web 47, 48 which projects axially into the associated control chamber 27.2, 28.2 and the inside diameter of which is greater than the outside diameter of the relevant tubular nozzle 41, 42 and the axial outer edge 49, 50 of which projects beyond the axial outer edge 43, 44 of the relevant tubular nozzle 41, 42 axially in the direction of the inner wall 55, 56 of the respective control chamber 27.2, 28.2 when the diaphragm 17.2, 18.2 is closed. In the case of both diaphragm valves 6.2, 7.2, the annular web 47, 48 of the diaphragm 17.2, 18.2 in each case projects in the present case to such an extent into the control chamber 27.2, 28.2 that the axially opposite inner wall 55, 56 of the control chamber 27.2, 28.2 acts as a stop surface for the respective diaphragm 17.2, 18.2 in interaction with the axial outer edge 49, 50 of the annular web 47, 48 when the diaphragm valve 6.2, 7.2 is opened. In order to reduce the surface pressure when resting against the inner wall 55, 56 of the control chamber 27.2, 28.2, the axial outer edge 49, 50 of the annular web 47, 48 is designed as a flat annular surface 51, 52 in each case.

Figure 2B:
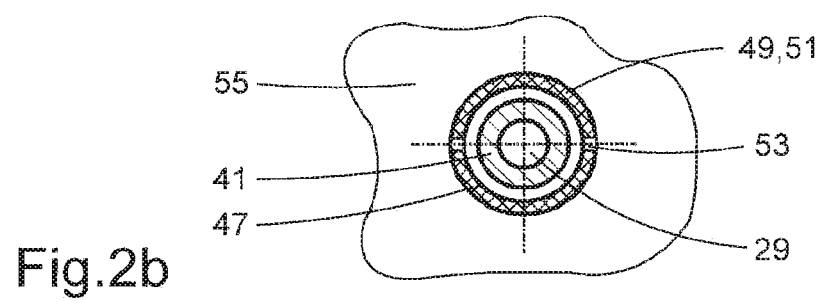
FIG. 2b shows a detail of the second embodiment of the valve unit according to FIGS. 2 and 2a in a fragmentary axial view.

The fragmentary axial view depicted in FIG. 2*b*, in which the direction of view D corresponds to that in FIG. 2*a*, is intended to illustrate that the axial outer edge 49, 50 of the annular web 47, 48 is in each case provided with a recess 53, 54 to prevent the diaphragm 17.2, 18.2 from becoming stuck on the inner wall 55, 56 of the relevant control chamber 27.2, 28.2 due to suction, said recess being designed in the present case as a diagonal groove of semicircular cross section.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1.1 valve unit (first embodiment)
1.2 valve unit (second embodiment)
2 valve housing
3 brake pressure inlet
4 brake pressure outlet
5 vent outlet
6.1, 6.2 inlet valve, diaphragm valve
7.1, 7.2 outlet valve, diaphragm valve
8 pilot valve of inlet valve 6.1, 6.2, solenoid valve
9 pilot valve of outlet valve 7.1, 7.2, solenoid valve
10 parting plane
11 base housing
12 housing cover
13 control unit
14.1 intermediate plate
14.2 intermediate plate
15 actuation axis of inlet valve 6.1, 6.2
16 actuation axis of outlet valve 7.1, 7.2
17.1 diaphragm of inlet valve 6.1
17.2 diaphragm of inlet valve 6.2
18.1 diaphragm of outlet valve 7.1
18.2 diaphragm of outlet valve 7.2
19 longitudinal direction
20 central passage of inlet valve 6.1, 6.2
21 central passage of outlet valve 7.1, 7.2
22 valve seat of inlet valve 6.1, 6.2
23 valve seat of outlet valve 7.1, 7.2
24 annular passage of inlet valve 6.1, 6.2
25 annular passage of outlet valve 7.1, 7.2
26 connecting passage
27.1 control chamber of inlet valve 6.1
27.2 control chamber of inlet valve 6.2
28.1 control chamber of outlet valve 7.1
28.2 control chamber of outlet valve 7.2
29 control pressure line of inlet valve 6.1, 6.2
30 control pressure line of outlet valve 7.1, 7.2
31 control pressure line of pilot valve 8, 9
32 control pressure line of pilot valve 8, 9
33 tubular nozzle
34 tubular nozzle
35 outer edge of tubular nozzle 33
36 outer edge of tubular nozzle 34
37 annular surface of tubular nozzle 33
38 annular surface of tubular nozzle 34
39 recess in the outer edge 35, 37
40 recess in outer edge 36, 38
41 tubular nozzle
42 tubular nozzle
43 outer edge of tubular nozzle 41
44 outer edge of tubular nozzle 42
45 annular surface on the outer edge 43
46 annular surface on the outer edge 44
47 annular web of diaphragm 17.2
48 annular web of diaphragm 18.2
49 outer edge of the annular web 47
50 outer edge of the annular web 48
51 annular surface of the annular web 47
52 annular surface of the annular web 48
53 recess in the outer edge 49, 51
54 recess in the outer edge 50, 52
55 inner wall of control chamber 27.2
56 inner wall of control chamber 28.2
A detail
B direction of view
C detail
D direction of view

The invention claimed is:

1. A valve unit for modulating pressure in a pneumatic brake system, the valve unit comprising:
an inlet valve, the inlet valve being a first springless diaphragm valve having a first diaphragm and a first control chamber;
an outlet valve, the outlet valve being a second springless diaphragm valve having a second diaphragm and a second control chamber;
a brake pressure outlet;
a vent outlet;
a brake pressure inlet;
a first pilot valve, the first pilot valve being a first 3/2-way solenoid valve configured to supply the first control chamber with a first control pressure via a first control pressure line;
a second pilot valve, the second pilot valve being a second 3/2-way solenoid valve configured to supply the second control chamber with a second control pressure via a second control pressure line,
wherein the inlet valve and the outlet valve have parallel actuation axes extending in an axial direction,
wherein the inlet valve and the outlet valve are arranged in a valve housing and adjacent to each other in a radial direction,
wherein the first and second diaphragms are clamped between two housing parts of the valve housing,
wherein the first control pressure line ends in a first tubular nozzle projecting, in the axial direction, into the first control chamber to an extent such that an outer edge of the first tubular nozzle acts as a stop for the first diaphragm in the axial direction when the inlet valve is opened, wherein the second control pressure line ends in a second tubular nozzle projecting, in the axial direction, into the second control chamber to an extent such that an outer edge of the second tubular nozzle acts as a stop for the second diaphragm in the axial direction when the outlet valve is opened, wherein each of the outer edge of the first tubular nozzle and the outer edge of the second tubular nozzle is provided with at least one recess configured to prevent the corresponding diaphragm from becoming stuck due to suction, and wherein the at least one recess in the outer edge of each of the first tubular nozzle and the second tubular nozzle is a diagonal groove having a semicircular cross section.

2. The valve unit as claimed in claim 1, wherein each of the outer edge of the first tubular nozzle and the outer edge of the second tubular nozzle is designed as a flat annular surface, the flat annular surface being configured to reduce a surface pressure on the corresponding diaphragm when the corresponding diaphragm rests thereon.

3. The valve unit as claimed in claim 1, wherein the brake pressure inlet is connected to an annular passage of the inlet valve, wherein a central passage of the inlet valve is connected to an annular passage of the outlet valve, wherein the annular passage of the outlet valve is connected to the brake pressure outlet, and wherein a central passage of the outlet valve is connected to the vent outlet.

4. The valve unit as claimed in claim 3, wherein the valve unit has an increase pressure switching mode, wherein in the increase pressure switching mode:

the first pilot valve supplies the first control chamber with a low control pressure in order to open the inlet valve thereby connecting the annular passage of the inlet valve to the central passage of the inlet valve, and the second pilot valve supplies the second control chamber with a high control pressure in order to close the outlet valve thereby shutting off the annular passage of the outlet valve from the central passage of the outlet valve.

5. The valve unit as claimed in claim 3, wherein the valve unit has a hold pressure switching mode, wherein in the hold pressure switching mode:

the first pilot valve supplies the first control chamber with a high control pressure in order to close the inlet valve thereby shutting off the annular passage of the inlet valve from the central passage of the inlet valve, and the second pilot valve supplies the second control chamber with a high control pressure in order to close the outlet valve thereby shutting off the annular passage of the outlet valve from the central passage of the outlet valve.

6. The valve unit as claimed in claim 3, wherein the valve unit has a lower pressure switching mode, wherein in the lower pressure switching mode:

the first pilot valve supplies the first control chamber with a high control pressure in order to close the inlet valve thereby shutting off the annular passage of the inlet valve from the central passage of the inlet valve, and the second pilot valve supplies the second control chamber with a low control pressure in order to open the outlet valve thereby connecting the annular passage of the outlet valve to the central passage of the outlet valve.

7. A valve unit for modulating pressure in a pneumatic brake system, the valve unit comprising:

a brake pressure inlet;

an inlet valve, the inlet valve being a first springless diaphragm valve having a first diaphragm, a first control chamber, an annular passage connected to the brake pressure inlet, and a central passage;

an outlet valve, the outlet valve being a second springless diaphragm valve having a second diaphragm, a second control chamber, an annular passage connected to the central passage of the inlet valve, and a central passage;

a brake pressure outlet connected to the annular passage of the outlet valve;

a vent outlet connected to the central passage of the outlet valve;

a first pilot valve, the first pilot valve being a first 3/2-way solenoid valve configured to supply the first control chamber with a first control pressure via a first control pressure line;

a second pilot valve, the second pilot valve being a second 3/2-way solenoid valve configured to supply the second control chamber with a second control pressure via a second control pressure line, wherein the inlet valve and the outlet valve have parallel actuation axes extending in an axial direction, wherein at least one of the first control pressure line and the second control pressure line ends in a tubular nozzle projecting, in the axial direction, into a corresponding control chamber, wherein the tubular nozzle terminates, in the axial direction, at an outer edge of the tubular nozzle, the outer edge lying in a radial plane that extends perpendicularly to the axial direction, wherein the outer edge includes a recess configured to prevent the corresponding diaphragm from becoming stuck due to suction, wherein the recess in the outer edge is a groove, and wherein the groove has a semicircular cross section.

8. The valve unit as claimed in claim 7, wherein the inlet valve and the outlet valve are arranged adjacent to each other in a radial direction in a valve housing, the radial direction being perpendicular to the axial direction.

9. The valve unit as claimed in claim 8, wherein the first and second diaphragms are clamped between two housing parts of the valve housing.

10. The valve unit as claimed in claim 7, wherein the other of the first control pressure line and the second control pressure line ends in a second tubular nozzle projecting, in the axial direction, into a corresponding control chamber, wherein the second tubular nozzle terminates, in the axial direction, at an outer edge of the second tubular nozzle, the outer edge of the second tubular nozzle lying in a radial plane that extends perpendicularly to the axial direction, and wherein the outer edge of the second tubular nozzle includes a recess configured to prevent the corresponding diaphragm from becoming stuck due to suction.

11. The valve unit as claimed in claim 10, wherein the recess in the outer edge of the second tubular nozzle is a groove having a semicircular cross section.

12. The valve unit as claimed in claim 7, wherein the valve unit has an increase pressure switching mode, wherein in the increase pressure switching mode:

the first pilot valve supplies the first control chamber with a low control pressure in order to open the inlet valve thereby connecting the annular passage of the inlet valve to the central passage of the inlet valve, and the second pilot valve supplies the second control chamber with a high control pressure in order to close the outlet valve thereby shutting off the annular passage of the outlet valve from the central passage of the outlet valve.

13. The valve unit as claimed in claim 7, wherein the valve unit has a hold pressure switching mode, wherein in the hold pressure switching mode:
the first pilot valve supplies the first control chamber with a high control pressure in order to close the inlet valve thereby shutting off the annular passage of the inlet valve from the central passage of the inlet valve, and
the second pilot valve supplies the second control chamber with a high control pressure in order to close the outlet valve thereby shutting off the annular passage of the outlet valve from the central passage of the outlet valve.

14. The valve unit as claimed in claim 7, wherein the valve unit has a lower pressure switching mode, wherein in the lower pressure switching mode:
the first pilot valve supplies the first control chamber with a high control pressure in order to close the inlet valve thereby shutting off the annular passage of the inlet valve from the central passage of the inlet valve, and
the second pilot valve supplies the second control chamber with a low control pressure in order to open the outlet valve thereby connecting the annular passage of the outlet valve to the central passage of the outlet valve.

15. The valve unit as claimed in claim 7, wherein the first pilot valve is configured to open the inlet valve by supplying the first control chamber with a low control pressure so as to move the first diaphragm away from a first valve seat thereby connecting the annular passage of the inlet valve to the central passage of the inlet valve,
wherein the first pilot valve is configured to close the inlet valve by supplying the first control chamber with a high control pressure so as to bias the first diaphragm towards the first valve seat thereby shutting off the annular passage of the inlet valve from the central passage of the inlet valve;
wherein the second pilot valve is configured to open the outlet valve by supplying the second control chamber with a low control pressure so as to move the second diaphragm away from a second valve seat thereby connecting the annular passage of the outlet valve to the central passage of the outlet valve,
wherein the second pilot valve is configured to close the outlet valve by supplying the second control chamber with a high control pressure so as to bias the second diaphragm towards the second valve seat thereby shutting off the annular passage of the outlet valve from the central passage of the outlet valve.

16. The valve unit as claimed in claim 7, wherein the tubular nozzle extends, in the axial direction, into the corresponding control chamber to an extent such that the outer edge acts as a stop for the corresponding diaphragm in the axial direction when the corresponding valve is opened.

17. The valve unit as claimed in claim 16, wherein the outer edge is a flat annular surface configured to reduce a surface pressure on the corresponding diaphragm when the corresponding diaphragm rests thereon.

* * * * *